(12) United States Patent
Hamlin

(10) Patent No.: US 6,310,888 B1
(45) Date of Patent: Oct. 30, 2001

(54) SYSTEM AND METHOD FOR COMMUNICATING DATA

(75) Inventor: James K. Hamlin, Kernersville, NC (US)

(73) Assignee: iWork Software, LLC, Greensboro, NC (US)

(*) Notice: Subject to any disclaimer, the term of this patent is extended or adjusted under 35 U.S.C. 154(b) by 0 days.

(21) Appl. No.: 09/000,751

(22) Filed: Dec. 30, 1997

(51) Int. Cl.[7] .................................................. H04J 3/16
(52) U.S. Cl. ..................................................... 370/466
(58) Field of Search .................... 370/338, 397, 370/408, 410, 466, 465, 467; 714/800; 709/223, 230, 201

(56) References Cited

U.S. PATENT DOCUMENTS

| | | | |
|---|---|---|---|
| 4,598,404 | * | 7/1986 | Perry et al. .............................. 371/49 |
| 5,339,434 | * | 8/1994 | Rusis ...................................... 395/700 |
| 5,394,546 | * | 2/1995 | Hanatsuka ............................. 395/600 |
| 5,406,557 | | 4/1995 | Baudoin .................................. 370/61 |
| 5,608,874 | * | 3/1997 | Ogawa et al. ................... 395/200.15 |
| 5,694,580 | * | 12/1997 | Narita et al. .......................... 395/500 |
| 6,130,917 | * | 10/2000 | Monroe ................................. 375/295 |

FOREIGN PATENT DOCUMENTS

WO 97/37500  10/1997 (WO) .............................. H04Q/3/00

OTHER PUBLICATIONS

IBM Corporation, "MQSeries Version 5—The Next Generation," (visited on Apr. 20, 1998) <http://www.software.ibm.com/ts/mqseries/library/whitepapers/mq5/>.

* cited by examiner

Primary Examiner—Chau Nguyen
Assistant Examiner—Alexander O. Boakye
(74) Attorney, Agent, or Firm—Fish & Neave; Jeffrey H. Ingerman; Matthew T. Byrne

(57) ABSTRACT

The present invention provides a system and method for communicating data between a source application process and one or more destination application processes. This system and method perform conversion and routing functions which require only a single conversion of all outbound transmissions regardless of the variety of destinations, and only a single conversion of all inbound transmissions regardless of the variety of sources. The functions also enable changes, additions, and deletions of sources and destinations of transmissions to be made without modification of a source or destination application process and without taking a source or destination application process off-line. The functions further enable this system and method to be implemented in virtually any enterprise architecture without requiring that each processing system of the architecture be custom built. These conversion and routing functions are performed by first receiving data to be transmitted in a source format from a source application. This data are then converted from the Source format to a standard format. Next, one or more destinations are identified in a database using a transaction type corresponding to the data and/or the address of the source application. After identifying the one or more destinations, a copy of the data is transmitted to each and the data are then converted from the standard format to a destination format. Lastly, this converted data are passed to the destination process.

81 Claims, 9 Drawing Sheets

SYSTEM AND METHOD FOR COMMUNICATING DATA

BACKGROUND OF THE INVENTION

This invention relates to systems and methods for communicating data. More particularly, this invention relates to systems and methods for communicating data between a source process and one or more destination processes, in which data are converted from a source format to a standard format, the data are routed from the source process to the one or more destination processes, the data are converted from the standard format to a destination format for each destination process, and receipt of the data is verified at each destination process.

Integrated processing architectures in which a variety of processing systems communicate with each other over a communication network are widely used in commerce. Because of the different communication requirements of each processing system in such architectures, it is frequently necessary to incorporate multiple translation processes into each transmitting or receiving processing system to translate outgoing or incoming data. This necessity becomes particularly burdensome as the variety of source transmission formats or destination transmission formats increases for any processing system. For example, in an architecture comprising four format-unique processing systems A, B, C, and D in which A transmits data to all of B, C, and D, and D receives data from all of A, B, and C, both A and D would need to have three translators each to respectively convert the transmissions to and from the necessary formats.

Another disadvantage with these architectures is that changing, adding, and/or removing sources and/or destinations for data transmissions is difficult because the application processes that generate each copy of the transmissions generated and that perform the corresponding translations, must be modified. These modifications may be particularly problematic to the extent that they introduce potential flaws into the application processes and that they require the modified applications to be taken off-line while being altered.

A further disadvantage with these architectures is that each architecture is usually unique from enterprise to enterprise because of the unique needs and desires of the enterprises, and, therefore, each architecture must be custom built at significant expense in both time and money. For example, in the architecture comprising processing systems A, B, C, and D used as an example above, each processing system would have to be custom built to incorporate the required translators for each of the other systems. Likewise, in another similar architecture comprising processing systems A, B, C, D, and E, each processing system would also have to be custom built to incorporate the required translators for each of the other systems although only one additional system (i.e., system E) makes this architecture different from the first architecture.

In view of the foregoing, it would be desirable to be able to provide a system and method for communicating data between a source process and one or more destination processes which do not require a separate translator on each source or destination processing system for each data format type to be transmitted or received, respectively.

It would be also desirable to be able to provide a system and method for communicating data between a source process and one or more destination processes which do not require an application process to be modified to change, add, or remove a source or destination of a data transmission.

It would be further desirable to be able to provide a system and method for communicating data between a source process and one or more destination processes which do not require an application process to be taken off-line to change, add, or remove a source or destination of a data transmission.

It would be still further desirable to be able to provide a system and method for communicating data between a source process and one or more destination processes that can be implemented in virtually any enterprise architecture without requiring that each processing system of the architecture be custom built.

SUMMARY OF THE INVENTION

It is therefore an object of this invention to provide a system and method for communicating data between a source process and one or more destination processes which do not require a separate translator on each source or destination processing system for each data format type to be transmitted or received, respectively.

It is another object of this invention to provide a system and method for communicating data between a source process and one or more destination processes which do not require an application process to be modified to change, add, or remove a source or destination of a data transmission.

It is still another object of this invention to provide a system and method for communicating data between a source process and one or more destination processes which do not require an application process to be taken off-line to change, add, or remove a source or destination of a data transmission.

It is yet another object of this invention to provide a system and method for communicating data between a source process and one or more destination processes that can be implemented in virtually any enterprise architecture without requiring that each processing system of the architecture be custom built.

In accordance with the present invention, a system and method for communicating data between a source application process and one or more destination application processes, which achieve these and other objects, are provided. More particularly, the system and method of the present invention perform uniform conversion and routing functions which require only a single conversion of all outbound data transmissions regardless of the variety of data destinations and only a single conversion of all inbound data transmissions regardless of the variety of data sources. Through these function, the system and method of the present invention enable changes, additions, and deletions of sources and destinations of data transmissions to be made without modification of a source or destination application process and without taking a source or destination application process off-line. Also, by using uniform conversion and routing functions, this system and method may be implemented in virtually any enterprise architecture without requiring that each processing system of the architecture be custom built.

These conversion and routing functions are performed by first receiving, in a source format and from a source application, data to be transmitted. These data are then converted from the source format to a standard format. Next, one or more destination addresses are identified based upon a transaction type corresponding to the data to be transmitted and/or the address of the source application. After identifying the one or more destination addresses, a copy of the data is then transmitted to each. Upon receipt of each copy of the data at the corresponding destination, the data are then converted from the standard format to a destination format. Lastly, these converted data are passed to a corresponding destination process.

In preferred embodiments of the system and method of the present invention, a receipt acknowledgment function is also performed. This function produces a receipt acknowledgment when transmitted data are received at a destination process. If this acknowledgment is not received at a source process prior to the occurrence of a given number of other transmission attempts or a given time period, an error notification will be generated. This error notification may then trigger an automated process that handles the error or alert a user to the error condition so that manual handling of the error can be accomplished.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which.

DETAILED DESCRIPTION OF THE INVENTION

Figure 1:
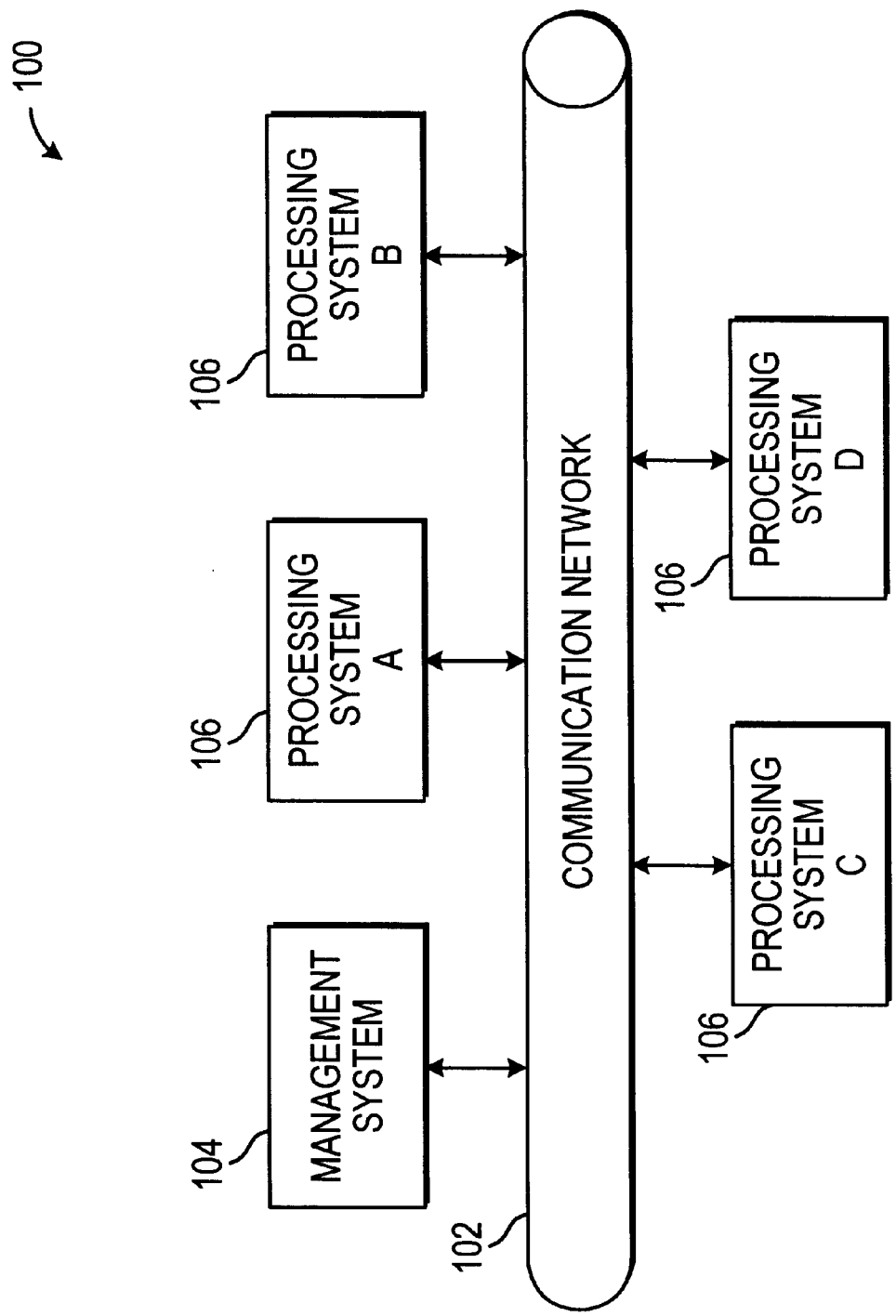
FIG. 1 is a block diagram of an integrated processing architecture in which a communication system in accordance with the present invention may be implemented.

The present invention provides a system and method for communicating data between multiple application processes that are being executed on one or more processing systems connected to a communication network. In communicating data between these application processes, the system and method may perform conversion, routing, and receipt verification functions. Preferably, these functions are performed by inbound and outbound broker processes that are each executed on the one or more processing systems. In preferred embodiments of the present invention, each of these functions may be configured and controlled through a user interface on a management system that is also connected to the communication network.

To facilitate data being communicated between application processes that require the data to be in different formats, the conversion function of the present invention first converts the data from a source format to a standard format, and then converts the data from the standard format to a destination format. The first conversion is preferably performed by an outbound broker process that is executed on a source processing system, and the second conversion is preferably performed by an inbound broker process that is executed on a destination processing system. In performing the first conversion, the outbound broker process first identifies the type of data being transmitted. Based upon the data type identified, the broker process then retrieves formatting rules which dictate how the source data are to be converted. Finally, the data are parsed from the source format and formatted into the standard format according to the formatting rules. Similarly, in performing the second conversion, the inbound broker process first identifies the type of data received. Based upon the data type identified, the broker process then retrieves formatting rules which dictate how the standardized data are to be converted. Finally, the data are parsed from the standard format and formatted into the destination format according to the formatting rules.

Prior to transmission, the outbound broker process also performs a routing function on the data to be transmitted. This routing function eliminates any need for a transmitting application process to identify a destination process for to-be-transmitted data, allows any number of destination processes to receive transmitted data, and enables application processes to be easily added and removed as destinations for transmitted data. In performing this function, the data type of data to be transmitted is first determined. One or more destination processes for the data are then identified from a list in a configuration database that is accessible to the outbound broker process. This identification may be performed, for example, by determining which destination processes listed in the database are indicated as receiving data of the determined data type and/or data from the source application process associated with this outbound broker process. Finally, for each of the identified destinations, a copy of the to-be-transmitted data is constructed and information identifying the corresponding destination process is added to each copy of the to-be-transmitted data so that the data may then be transmitted to each destination.

Through these conversion and routing functions, the system and method of the present invention can achieve the aforementioned objects. For example, only a single translator is required for each source or destination application process because the conversion process is always performing the same conversion regardless of where data is going to or coming from (i.e., the conversion process always converts data from a source format to a standard format or converts data from a standard format to a destination format). As another example, through the combination of the conversion function and the routing function, changes, additions, and deletions of sources and destinations of data transmissions can be made without the modification or shutting-down of an application process because the same conversion function is always performed for all data transmissions sent or received, and because the routing function refers to a database to retrieve the parameters for each particular transmission or reception. As still another example, the system and method of the present invention can be implemented in virtually any enterprise architecture without requiring that each processing system of the architecture be custom built because the conversion process is only dependent upon the application process to which it is being applied, and because the routing function relies on a database for controlling its operation that may be implemented separately from the corresponding application process.

The receipt verification function of the system and method of the present invention monitors whether data transmitted from a source application process to a destination application process by way of an outbound broker process and an inbound broker process is received by the destination application process. If the receipt verification function cannot verify that the transmitted data were received by the destination application process within a given number of other transmission attempts or a given time period, an error notification is generated to alert a user of a transmission failure. In performing the receipt verification function, data are first placed in an outbound data queue in the outbound broker process prior to transmission. After transmission, the outbound broker process listens for a receipt acknowledgment to be generated and transmitted by the inbound broker process of the destination application process. If the acknowledgment is received within a given number of other transmission attempts or a given time period, the transmitted data are removed from the outbound data queue and no further monitoring of this data transmission is performed. As mentioned above, however, if this acknowledgment is not received by the outbound broker process within a given number of other transmission attempts or a given time period, an error notification is generated. This error notification may then trigger an automated process that handles the error or alert a user to the error condition so that manual handling of the error can be accomplished.

To configure and control the processing of these functions of the system and method of the present invention, preferred embodiments may also include a management system that is connected to the communication network. Using this management system, a user may, for example, set up communications to or from new application processes, remove communications from existing application processes, add, remove, or modify data types and formats, add, remove, or modify destinations for any data type, specify criteria for receipt acknowledgment error notification generation, and enable or disable any of the conversion, routing, and receipt verification functions.

One embodiment of the system and method of the present invention is illustrated in more detail in FIGS. 1–10. FIG. 1 shows an integrated processing architecture 100 that may be used to implement the present invention, comprising a communication network 102, a management system 104, and processing systems A–D 106. Communication network 102 is preferably a computer network that supports the TCP/IP communication protocol, however, any suitable network or combination of networks may also be used. Management system 104, as mentioned above, is preferably used in architecture 100 to enable a user to configure and control the functions of the present invention. Although architecture 100 is illustrated as incorporating management system 104, the present invention could also be implemented without management system 104. Processing systems A–D 106 may be any suitable processing equipment that generates data. For example, any of processing systems A–D 106 may be an inventory management system, a financial processing system, a shipping control system, point of sale equipment such as cash registers and/or bar code scanning systems, or a warehouse management system. These systems 106, as well as management system 104, may be implemented on dedicated hardware, a personal computer, a mainframe computer, or any other suitable device or devices. Each of systems 106 may be a unique type of system that executes unique software on unique hardware, or any number or all of systems 106 may be partially or completely identical. Although four systems 106 are illustrated in architecture 100, any number of systems 106 may be used in implementing the present invention.

Figure 2:
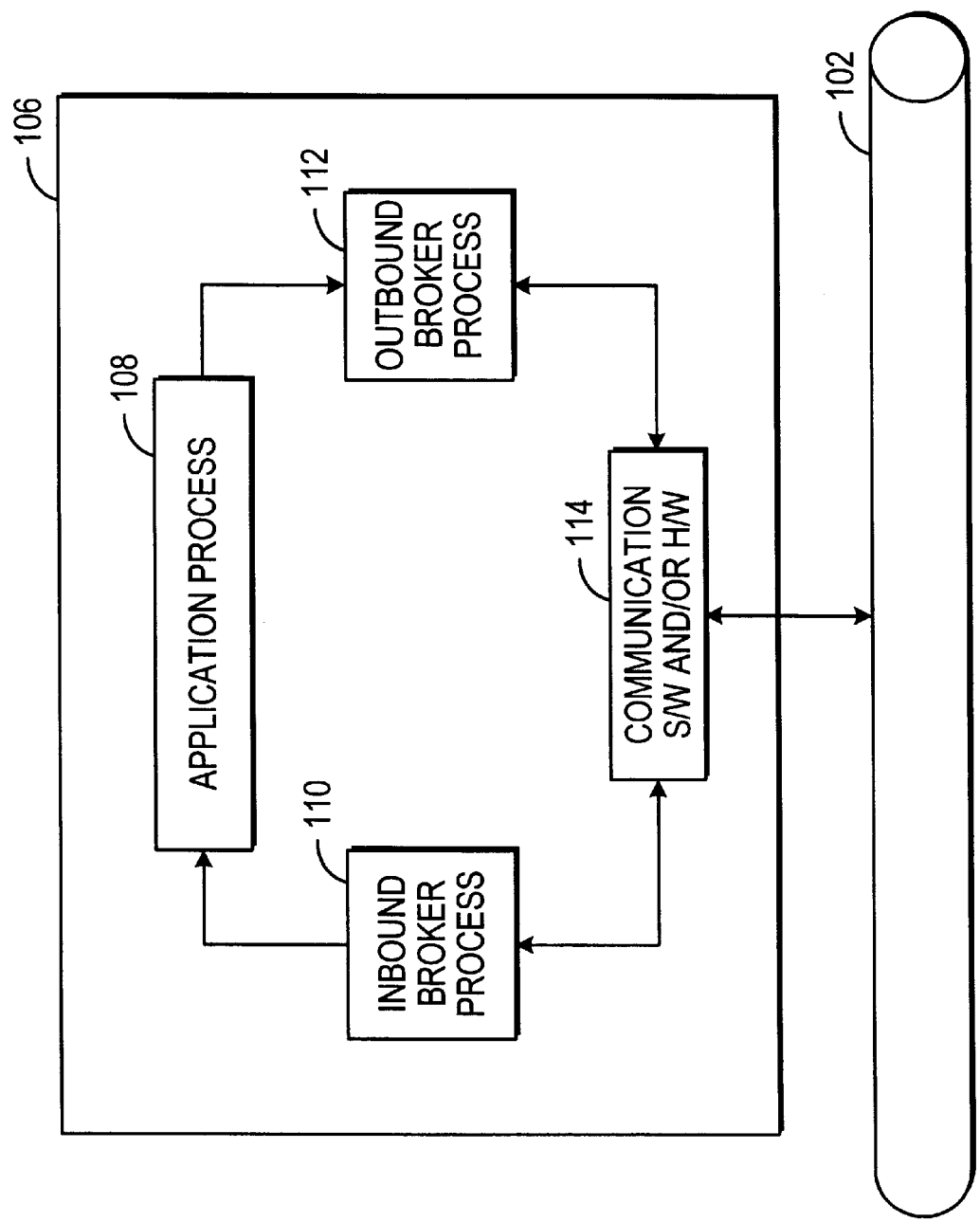
FIG. 2 is a block diagram of processing system implementing a portion of a communication system in accordance with the present invention.

Referring to FIG. 2, one of processing systems A–D 106 is illustrated in more detail. As shown, each system 106 comprises application process 108, an inbound broker process 110, an outbound broker process 112, and communication software and/or hardware 114. Application process 108 may be any suitable software for execution on system 106. For example, if system 106 is an inventory management system, application process 108 may be suitable inventory management software. Inbound broker process 110, as mentioned above, is used to implement portions of the functions of the present invention. For example, inbound broker process 110 may perform conversion and/or receipt verification of data received at processing system 106. Outbound broker process 112, as also mentioned above, is also used to implement portions of the functions of the present invention. For example, outbound broker process 112 may perform conversion, routing, and/or receipt verification of data to be transmitted from processing system 106. Although inbound broker process 110 and outbound broker process 112 are illustrated as being separate processes that are executed on processing system 106, processes 110 and 112 could also be executed in a single process or as any number of individual processes that is or are executed completely on, partially on, or completely off of processing system 106. For example, a single inbound/outbound broker could be implemented on a separate processor connected between processing system 106 and communication network 102. Lastly, communication software and/or hardware 114 may be any suitable combination of software and/or hardware that enables communication over communication network 102. For example, communication software and/or hardware 114 may comprise an Ethernet interface circuit card assembly and suitable driver software.

Figure 3:
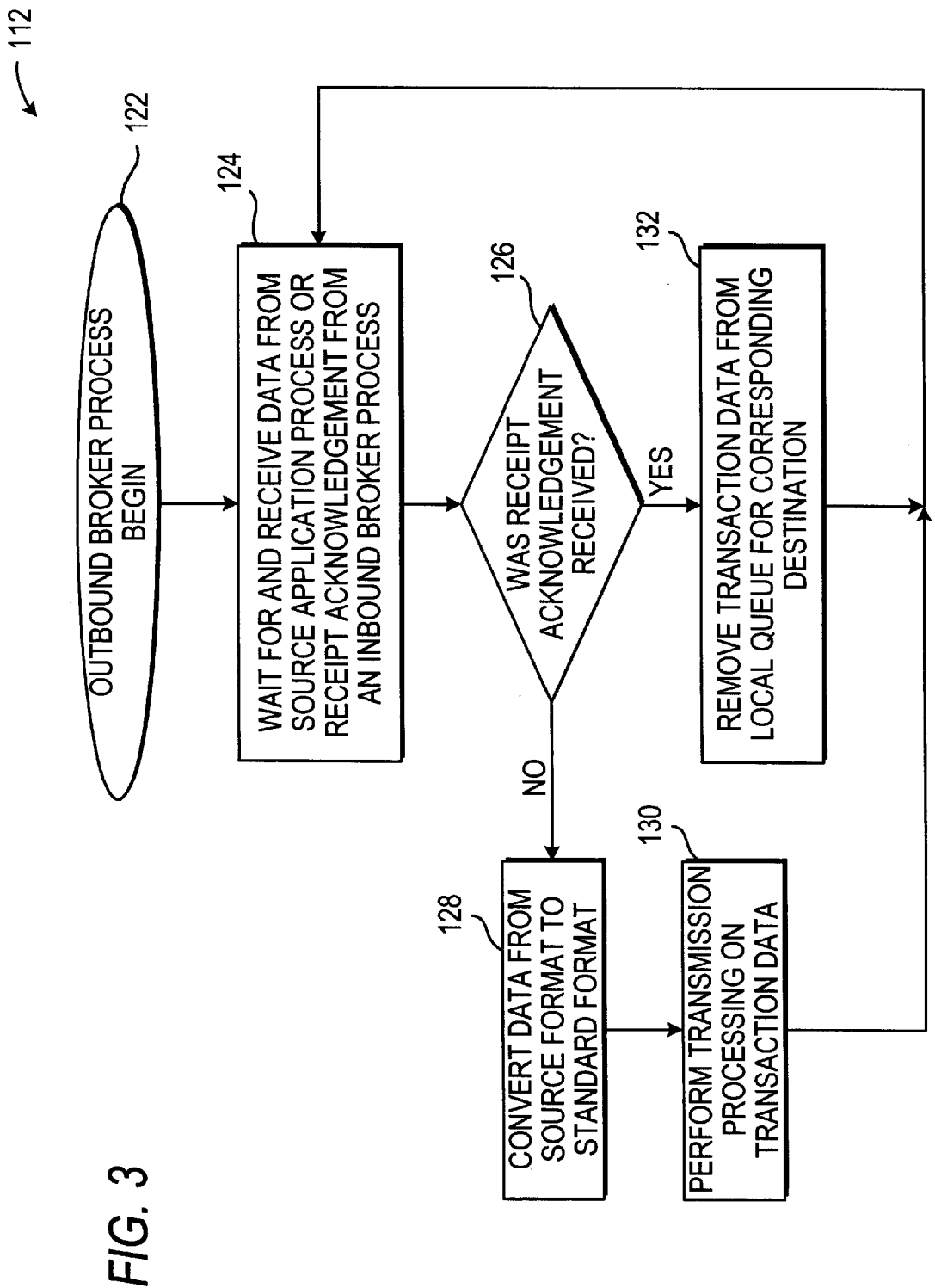
FIG. 3 is a flow diagram illustrating an outbound broker process for sending data and verifying data transmissions in a communication system in accordance with the present invention.

Outbound broker process 112 is illustrated in more detail in FIG. 3. As shown, once process 112 has begun at block 122, process 112 waits for and receives either data from source application process 108 (FIG. 2) or a receipt acknowledgment from an inbound broker process 110 (FIG. 2) of another application process 108 (FIG. 2). After data or a receipt acknowledgment is received at block 124, process 112 proceeds to test 126 to determine whether a receipt acknowledgment was received. If at test 126 a receipt acknowledgment is determined not to have been received, a conversion process is performed on the received data at block 128. This conversion process converts the data from a format associated with source application process 108 (FIG. 2) to a standard format. Once the data have been converted, a transmission process is performed on the data at block 130. This transmission process prepares the data for transmission and transmits the data. If at test 126 a receipt acknowledgment is determined to have been received, the corresponding transaction is recognized as being delivered and the associated data are removed from a local queue corresponding to the transaction's destination at block 132. Finally, after transmitting the data at block 130 or deleting the transaction data from the local queue at block 132, process 112 loops back to block 124 to again wait for and receive data or a receipt acknowledgment.

Figure 4:
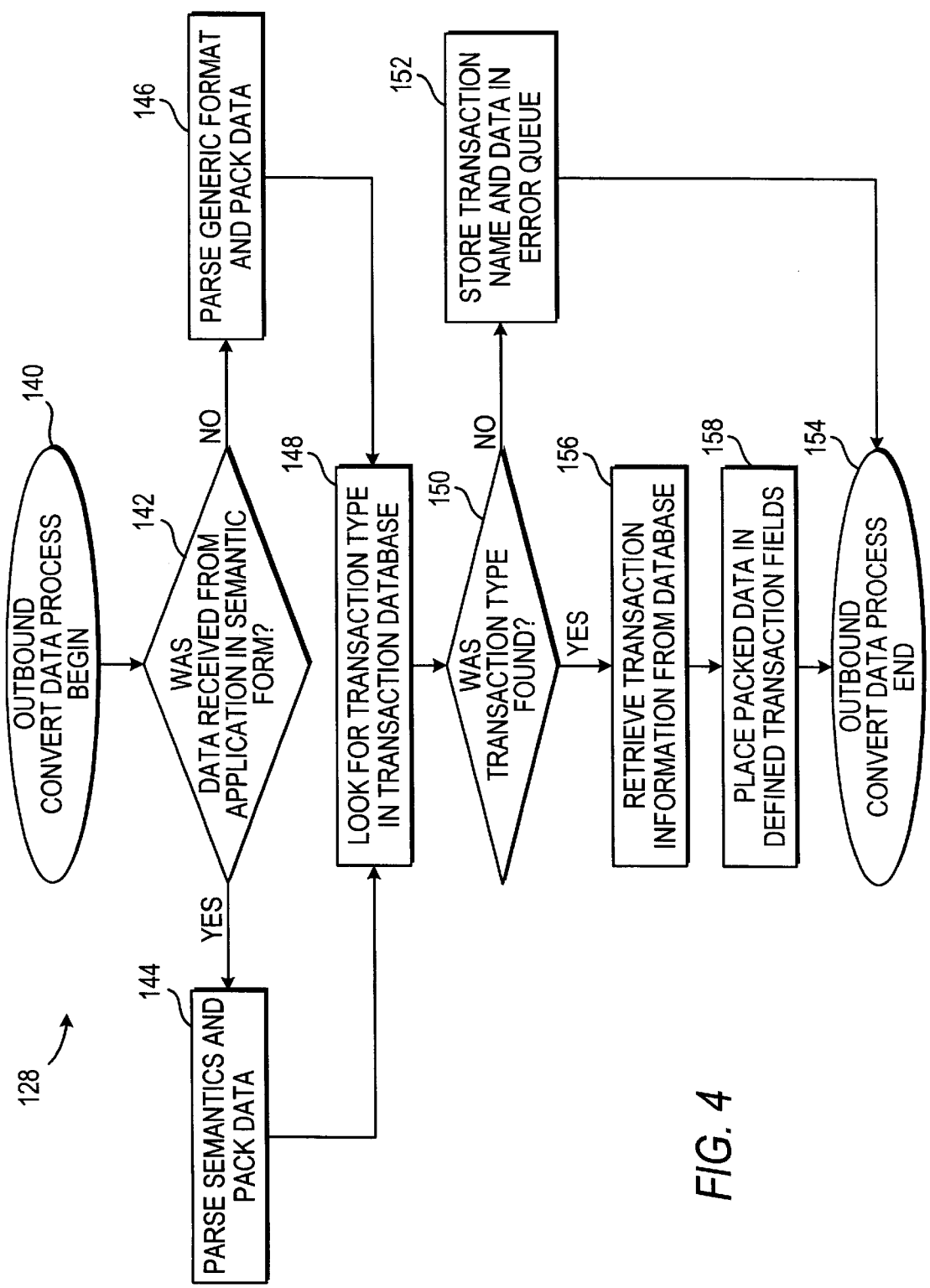
FIG. 4 is a flow diagram illustrating a process for converting data to be sent in a communication system in accordance with the present invention.

FIG. 4 illustrates the conversion process of block 128 of FIG. 3 in more detail. As shown, after this process has begun at block 140, the process first determines whether data to be transmitted were received from source application process 108 (FIG. 2) as a set of semantic assignments or as data in a generic format at test 142. As used herein, a semantic is a set of information that is associated with a piece of data and which includes a label and a set of system-specific requirements for the piece of data. For example, a semantic for a piece of shipping data may include a label entitled "to_location" that indicates that the piece of data represents where a shipment is being sent to, and a set of requirements which dictate that this data may only be assigned values of "dock," "warehouse," "factory," and "store" on a particular system 106 (FIGS. 1–2). When transmitted from an application process 108 (FIG. 2), a semantic assignment for this piece of data may be represented by a string such as "to_location=dock." Data in a generic format may include data passed by a source application 108 (FIG. 2) in any fashion other than as a set of semantic assignments. For example, data for a shipment may be sent in a generic format as a stream of characters separated by a predetermined delimiter such as a pipe character ("[|P]'). If the conversion process determines at block 142 that data were received from an application process as a set of semantic assignments, then the process parses those semantic assignments and packs the data at block 144. Otherwise, the process parses the data from a generic format and packs the data at block 146. The data packing performed in blocks 144 and 146 may be used to remove unnecessary information from a piece of data and may include removing leading zeros from a number and removing trailing spaces from a set of characters.

Once data received from source application process 108 (FIG. 2) have been packed at blocks 144 or 146, the conversion process looks for a transaction type corresponding to the to-be-transmitted data in a transaction database at block 148. This database is preferably stored locally on processing system 106 (FIG. 2) on which outbound broker process 112 (FIG. 3) is being executed. If the transaction type is then determined not to have been found at test 150, the conversion process stores the transaction name and data in an error queue at block 152 and terminates at block 154. Otherwise, if the transaction type is determined to have been found at test 150, then the corresponding transaction information is received from the transaction database at block 156. Finally, the packed data are placed in transaction fields defined by the transaction information at block 158 and the process is completed at block 154.

Figure 5:
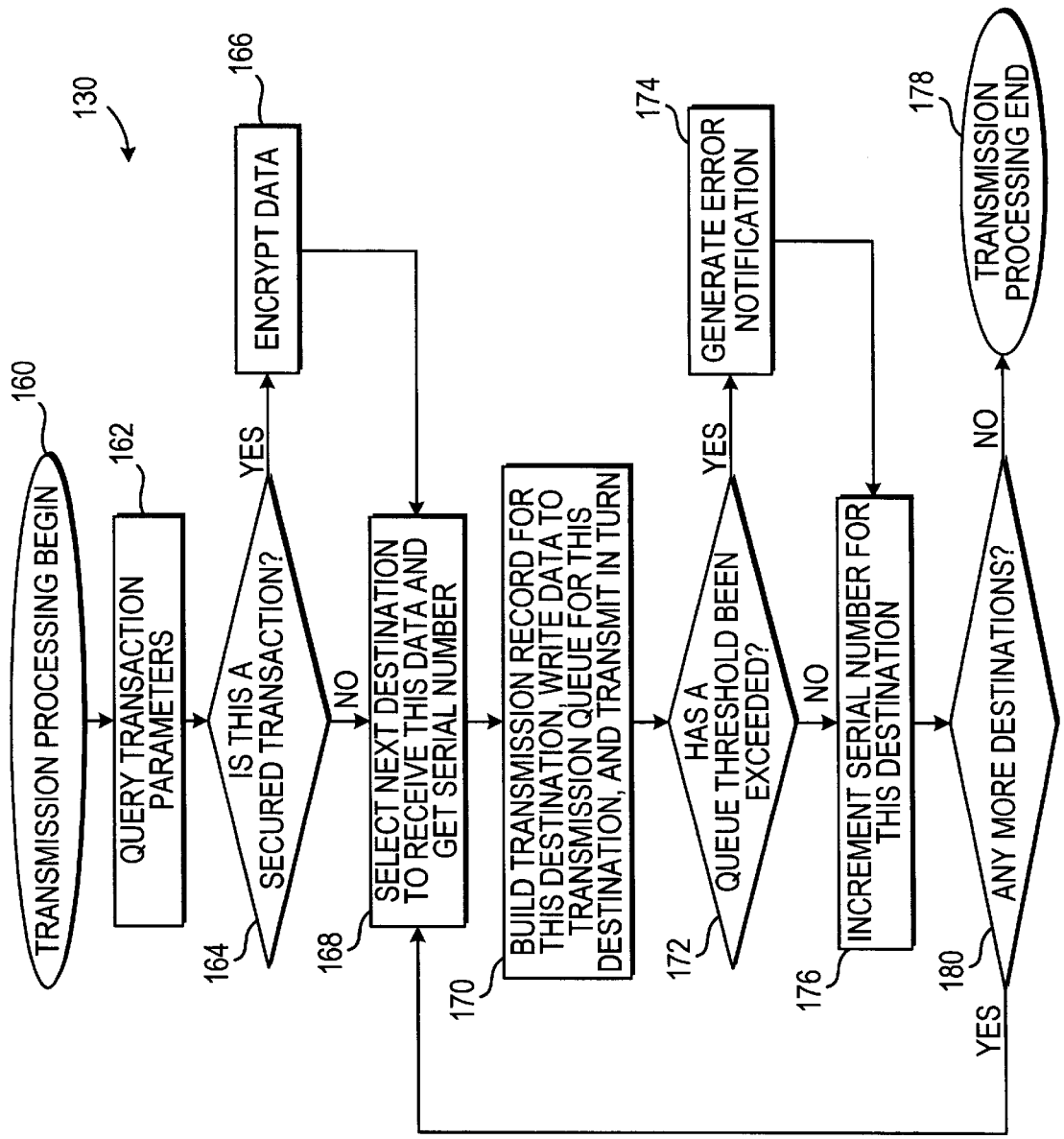
FIG. 5 is a flow diagram illustrating a process for transmitting data in a communication system in accordance with the present invention.

The transmission process of block 130 of FIG. 3 is illustrated in detail in FIG. 5. As shown, once the transmission process has begun at block 160, the process queries the transaction parameters for the data to be transmitted at block 162. These transaction parameters are preferably stored in a database located on the processing system in which outbound broker process 112 (FIG. 3) is being executed, and preferably include a list of the destination addresses for the transaction, whether the transaction is a secure transaction, etc. As stated above, the list of destination addresses for the transaction may be based upon the type of transaction to be transmitted or the particular source of the transaction. Next, at test 164, the process determines whether the transaction is a secure transaction based upon these parameters, and if so, the transaction data are encrypted at block 166. After encryption at block 166 or if the transaction is determined not to be a secure transaction at test 164, the first destination of the transaction is identified and a serial number for the transaction is obtained at block 168. Preferably, this serial number is selected incrementally for each transmission to the same destination from this source. Using incremental serial numbers in this way, allows a destination to recognize a lost transmission from a gap in adjacently received serial numbers from the same source.

Once a destination and serial number are selected, a transmission record is built for this destination, the record is written to a transmission queue, and the record is transmitted to the destination in turn at block 170. This transmission record may be used to identify the source address, the transaction type, whether the data are encrypted, and the date, time, and serial number of the transmission. The transmission record also contains the data to be transmitted. Furthermore, other information may also be included in the transmission recorded depending on the requirements of the specific system in which the present invention is being implemented. The transmission queue to which the data are then written is preferably a dedicated queue that only contains data to be transmitted to the designated destination. This queue is preferably maintained on processing system 106 (FIG. 2) on which outbound broker process 112 (FIG. 3) is being executed, although the queue may alternatively be located elsewhere as well. Once located in the transmission queue, the transaction data will then be transmitted in turn. This is preferably accomplished by transmitting one transaction from each queue for which there are data in a cyclic fashion. Alternatively, however, all or some portion of data for a single transmission queue may be transmitted prior to transmitting data for another queue.

After the transaction data have been placed in the corresponding transmission queue at block 170, the transmission process determines whether a queue threshold for this queue has been passed at test 172. This queue threshold may include a maximum number of entries in the queue, or a maximum amount of time for a queue entry to remain in the queue. A maximum number of entries threshold may be exceeded, for example, when transaction data in the transmission queue have not been deleted because the corresponding receipt acknowledgments have not been received by outbound broker process 112 (FIG. 3). If this threshold is determined to have been exceeded at test 172, an error notification is generated at block 174. After generating this notification at block 174 or if the threshold is determined not to have been exceeded at test 172, the serial number for the designated destination is incremented at block 176. Finally, at test 180, the transmission process determines whether these transaction data need to be transmitted to any other locations, and if so loops back to block 168. otherwise, the transmission process completes at block 178.

Figure 6:
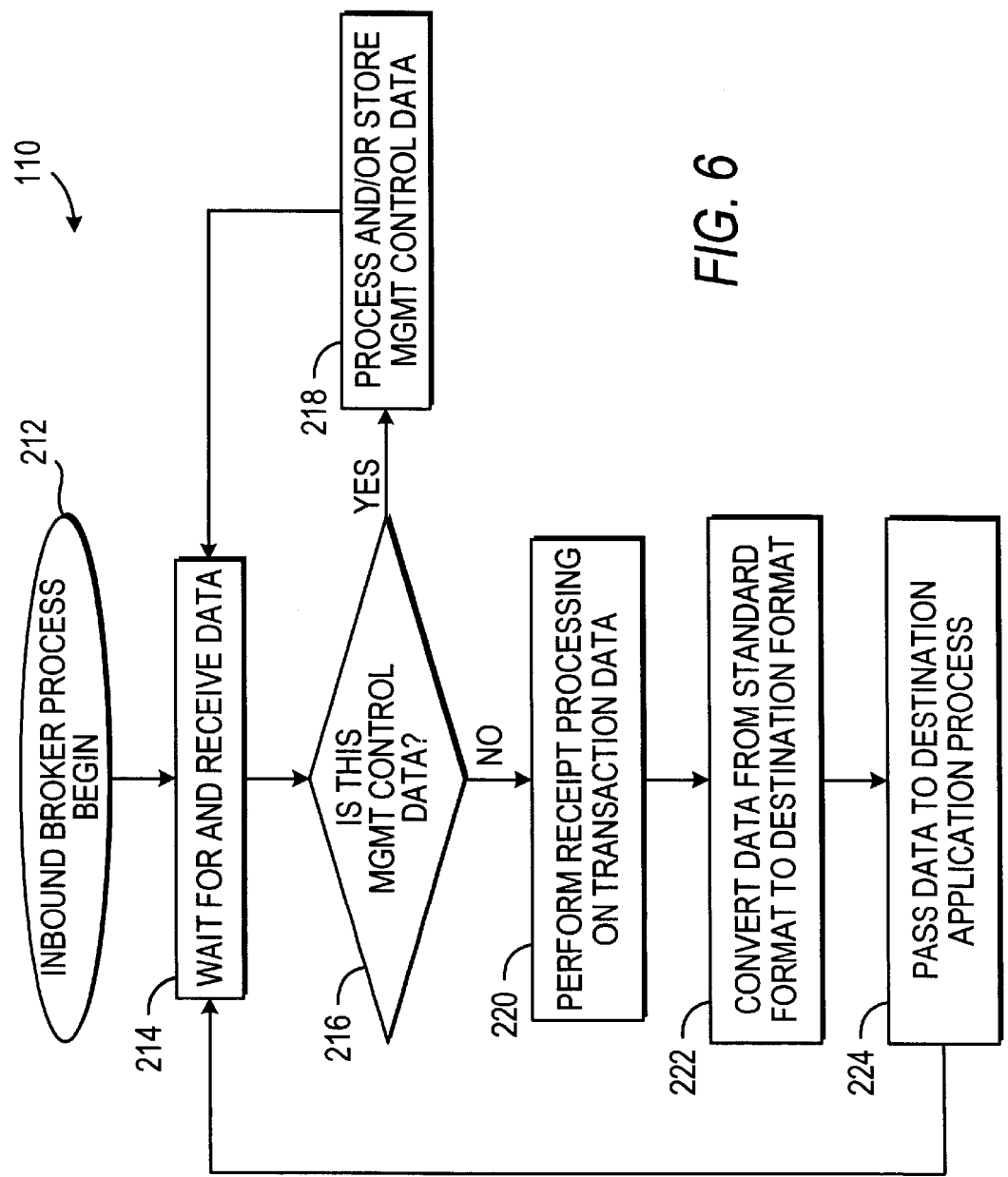
FIG. 6 is a flow diagram illustrating an inbound broker process for receiving data in a communication system in accordance with the present invention.

Referring to FIG. 6, inbound broker process 110 of FIG. 2 is illustrated in detail. As shown, after inbound broker process 110 has begun at block 212, process 110 waits for and receives a data transmission at block 214. This data transmission may include transaction data that are transmitted from an outbound broker process 112 (FIG. 3) of another processing system 106 (FIG. 3) or management control data that are transmitted from a management system 104 (FIG. 1). At test 216, process 110 determines which of these data types was received. If at test 216 management control data are determined to have been received, the data are processed and/or stored at block 218. Preferably, in processing and/or storing this management control data, the control information and configuration of both inbound broker process 110 (FIG. 2) and an outbound broker process 112 (FIG. 2) on processing system 106 (FIG. 2) can be modified. Alternatively, a separate mechanism may be included in outbound broker process 112 (FIG. 2) to receive and process and/or store this management control data.

If at test 216 the data received are determined not to be management control data, receipt processing is then performed on these data at block 220. Preferably, this receipt processing includes checking the integrity of the data received, generating a receipt acknowledgment for these data, and decrypting the data, if necessary. Once this receipt processing has been performed at block 220, the data are converted from the standard format to a format corresponding to the destination application process 108 (FIG. 2) at block 222. Finally, the data are passed to destination application process 108 (FIG. 2) at block 224, and then process 110 loops back to block 214 to wait for and receive more data. In passing the data to destination application process 108 (FIG. 2), inbound broker process 110 (FIG. 2) may interrupt application process 108 (FIG. 2) to alert it to the presence of the data, or may queue the data for subsequent polling by application process 108 (FIG. 2).

Figure 7:
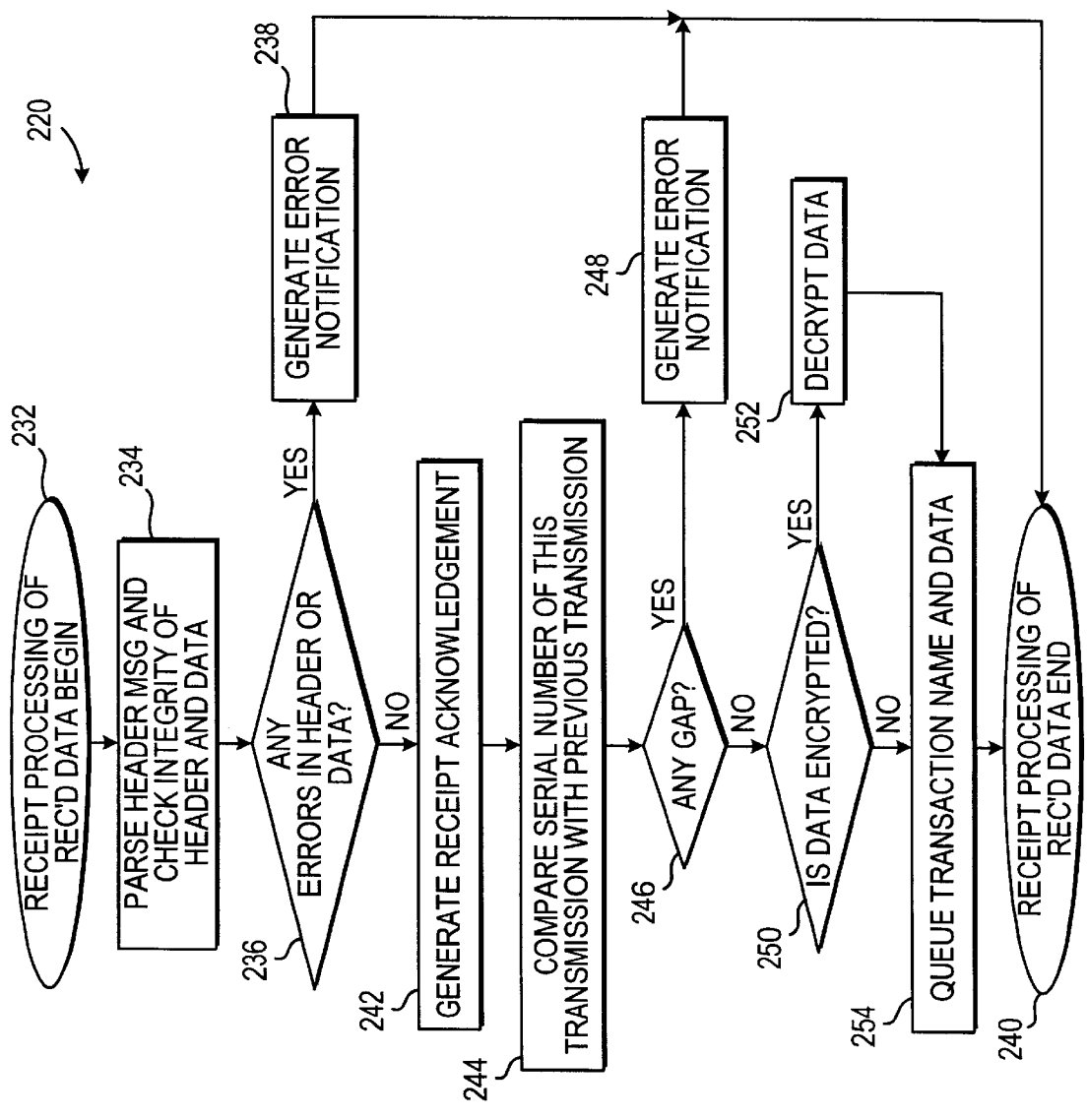
FIG. 7 is a flow diagram illustrating a process for verifying and acknowledging the integrity of data received in a communication system in accordance with the present invention.

The receipt processing performed in block 220 of FIG. 6 is illustrated in detail in FIG. 7. As shown, after the receipt processing of the received data has begun at block 232, the header message is parsed, and the integrity of the header and data is checked at block 234 and test 236. If at test 236 an error is determined to exist in the header or data, then an error notification is generated at block 238 and the receipt processing is terminated at block 240. Otherwise, if at test 236 no errors are detected in the header or data, a receipt acknowledgment is generated at block 242. Once the receipt acknowledgment is generated, the serial numbers of the currently received transaction and the previously received transaction from the same source are checked for a gap at block 244 and test 246. If a gap is detected at test 246, an error notification is generated at block 248 and the receipt processing is terminated at block 240. Otherwise, if no gap is detected at test 246, the processing determines at test 250 whether the data are encrypted from the header, and if so, the data are then decrypted at block 252. If at test 250 the data is determined to not be encrypted at test 250 or after the data have been decrypted at block 252, the transaction name and data are queued for conversion processing at block 254, after which receipt processing is completed at block 240.

Figure 8:
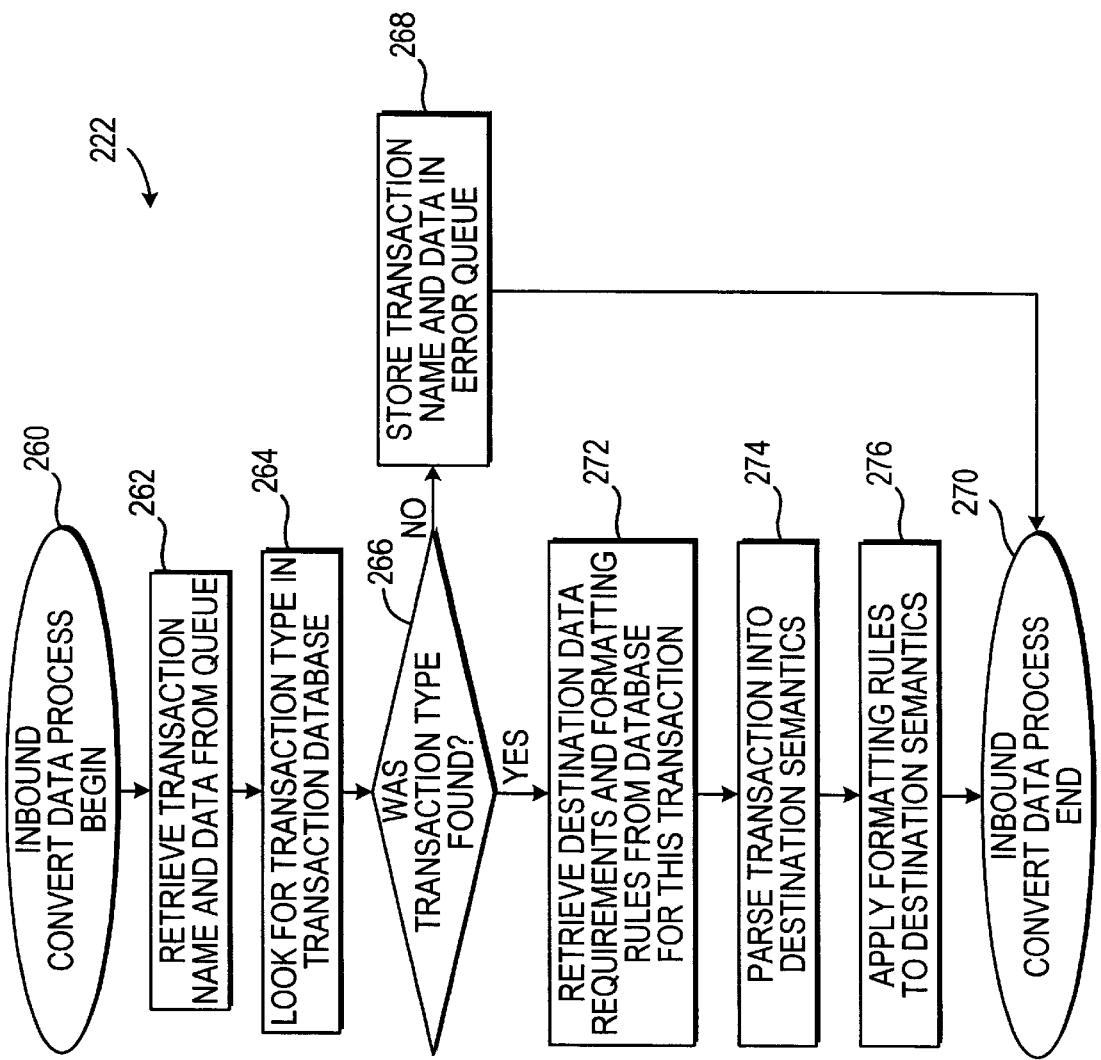
FIG. 8 is a flow diagram illustrating a process for converting received data in a communication system in accordance with the present invention.

The conversion process performed in block 222 of FIG. 6 is illustrated in FIG. 8. As shown, once the conversion processing has begun at block 260, the transaction name and transaction data are retrieved at block 262 from the queue into which these items were placed by block 254 of the receipt processing illustrated in FIG. 7. Next, at block 264 and test 266, the conversion process looks for the transaction type corresponding to this transaction in a transaction database and determines whether the transaction has been found. If the transaction type is determined not to have been found at test 266, the transaction name and data are stored in an error queue at block 268 and the conversion process is terminated at block 270. Otherwise, if the transaction type is determined to have been found at test 266, the destination application process data requirements and formatting rules are retrieved at block 272 for this transaction from the database. After retrieving this information, the transaction is parsed into destination application process semantics at block 274. Finally, the formatting rules are applied to these semantics at block 276 and then the conversion process is completed at block 270.

Figure 9:
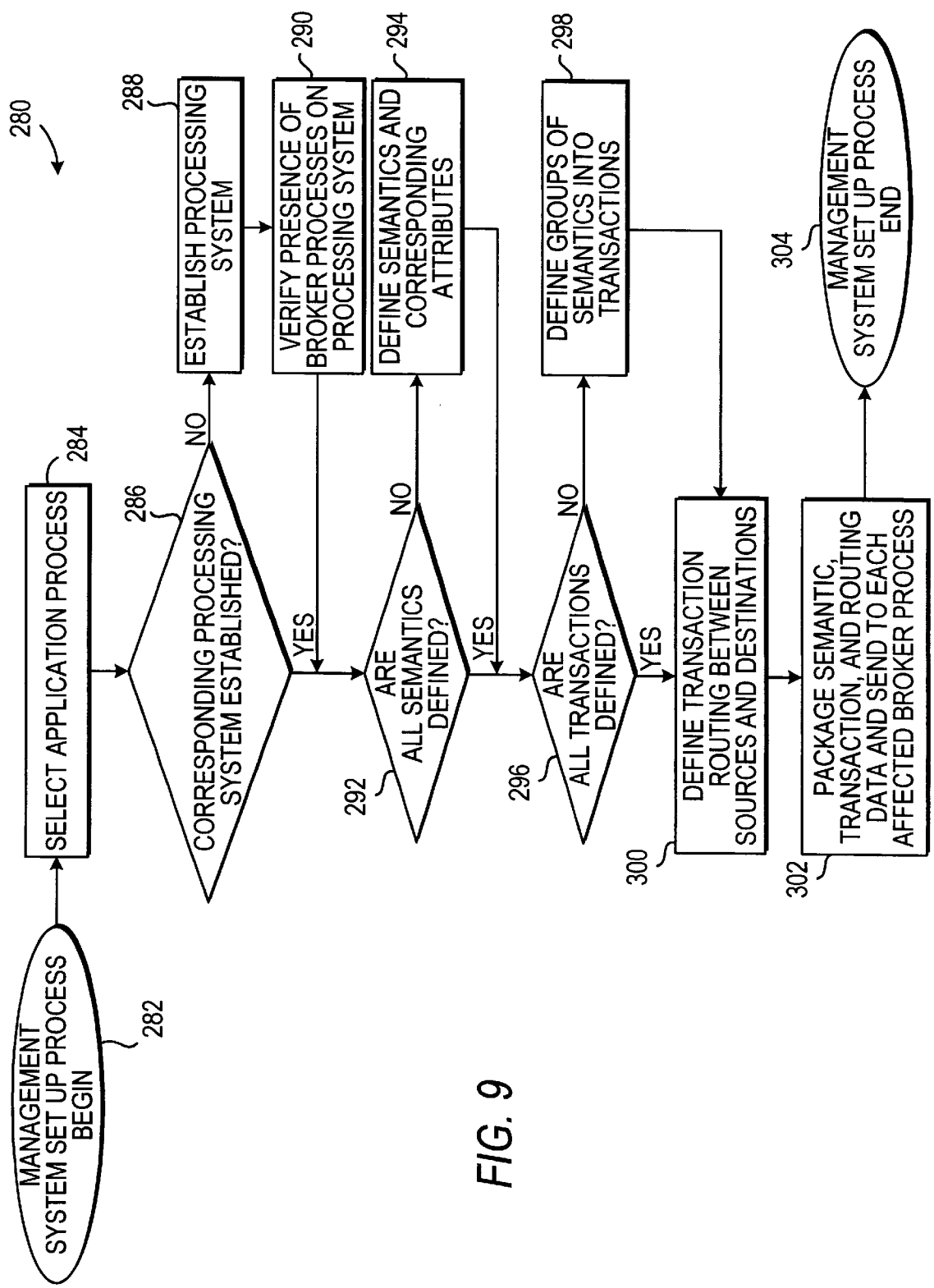
FIG. 9 is a flow diagram illustrating a management system process for setting up a communication system in accordance with the present invention.

A process 280 for execution in management system 104 of FIG. 1 is shown in FIG. 9. As illustrated, after process 280 has begun at block 282, an application process is selected for set up through user input or automatically at block 284.

Once an application process has been selected, process 280 determines at test 286 whether inbound and outbound broker processes have been established on the corresponding processing system. If test 286 determines that the broker processes have not been established, then process 280 establishes and verifies these processes at blocks 288 and 290. Once the broker processes have been verified at block 290 or if they were determined to have been established at test 286, process 280 determines whether all of the semantics for the application process have been defined at test 292. This may be accomplished by prompting a user, by performing checks on the application software, or by any other suitable method. If all of the semantics are determined not to have been defined, then the semantics and corresponding attributes are defined at block 294. These definitions may be entered manually by a user of the managing system or may be performed under an automated process. After all the semantics have been defined at block 294 or if all the semantics are determined to have been defined at test 292, then process 280 determines whether all transactions for the application process have been defined at test 296. If all of the transactions are determined not to have been defined at test 296, then groups of semantics are defined into the required transactions at block 298. As with the semantics definitions, the transaction definitions may be performed through user interaction or by an automated process. Once all of the transactions have been defined at block 298 or if all of the transactions are determined to have been defined at test 296, process 280 defines transaction routing between the source application process and the one or more destination application processes. As with the definition performed in blocks 294 and 298, this definition may be generated through user input or an automated process. Finally, at block 302, the semantic, transaction, and routing data are packaged and sent to each affected broker process, and then process 280 is completed at block 304.

Thus it is seen that by performing the conversion and routing functions of the system and method of the present invention, only a single translator is required for each source and destination application process using this system and method, changes, additions, and deletions of sources and destinations of data transmissions can be made without the modification or shutting-down of a source or destination application process using this system and method, and that this system and method can be implemented in virtually any enterprise architecture without requiring that each processing system of the architecture be custom built. One skilled the art will appreciate that the present invention can be implemented by other than the described embodiments, which are presented for purposes of illustration and not of limitation, and the present invention is limited only by the claims that follow.

What is claimed is:

1. A method of communicating data of a known data type from a source process to a destination process, the method comprising:

receiving said data in a source format from said source process;

converting said data from said source format to a standard format;

determining a destination address that is associated with said destination process based upon at least one of said known data type and a source address that is associated with said source process;

transmitting said data in said standard format with said destination address;

receiving said data transmitted in said standard format at said destination address;

converting said data in said standard format to a destination format;

transmitting said data in said destination format to said destination process;

prior to said receiving of said data in said source format, defining at least one of said known data type, said source address, said source format, said standard format, said destination format, and a relationship between said destination address and said at least one of said known data type and said source address, wherein said relationship is defined by accepting user input that defines said relationship between said destination address and said at least one of said known data type and said source address;

said determining using said relationship in determining said destination address; and said relationship relating said destination address to both said known data type and said source address.

2. The method of claim 1, further comprising:

when said data transmitted in said destination format is received at said destination process, generating an acknowledgment of receipt of said data; and notifying a user of an error upon an occurrence of at least one of a specified number of other transmission attempts and an absence of said acknowledgment of receipt within a given time period.

3. The method of claim 1, wherein each of said source format, said standard format, and said destination format are different.

4. The method of claim 1, wherein:

said source format and said destination format are identical; and said source format and said destination format are different from said standard format.

5. The method of claim 1, wherein said defining comprises accepting user input that defines said source address of said source process.

6. The method of claim 1, wherein said defining comprises accepting user input that defines said source format of said data.

7. The method of claim 1, wherein said defining comprises accepting user input that defines said destination format of said data.

8. The method of claim 1, wherein said converting of said data from said standard format to said destination format comprises selecting said destination format from a plurality of available destination formats based upon said known data type of said data.

9. The method of claim 1, wherein said converting of said data from said standard format to said destination format comprises selecting said destination format from a plurality of available destination formats based upon said destination address transmitted with said data in said standard format.

10. A method of communicating data of a known data type from a source process to a destination process, the method comprising;

receiving said data in a source format from said source process;

converting said data from said source format to a standard format;

determining a destination address that is associated with said destination process based upon at least one of said known data type and a source address that is associated with said source process;

transmitting said data in said standard format with said destination address;

receiving said data transmitted in said standard format at said destination address;

converting said data in said standard format to a destination format;

transmitting said data in said destination format to said destination process;

prior to said receiving of said data in said source format, defining at least one of said known data type, said source address, said source format, said standard format, said destination format, and a relationship between said destination address and said at least one of said known data type and said source address, wherein said relationship is defined by accepting user input that defines said relationship between said destination address and said at least one of said known data type and said source address;

said determining using said relationship in determining said destination address; and said relationship relating said destination address to said source address without relating said destination address to said known data type.

11. A method of communicating data of a known data type from a source process to a destination process, the method comprising:

receiving said data in a source format from said source process;

converting said data from said source format to a standard format;

determining a destination address that is associated with said destination process based upon at least one of said known data type and a source address that is associated with said source process;

transmitting said data in said standard format with said destination address;

receiving said data transmitted in said standard format at said destination address;

converting said data in said standard format to a destination format;

transmitting said data in said destination format to said destination process;

prior to said receiving of said data in said source format, defining at least one of said known data type, said source address, said source format, said standard format, said destination format, and a relationship between said destination address and said at least one of said known data type and said source address, wherein said relationship is defined by accepting user input that defines said relationship between said destination address and said at least one of said known data type and said source address;

said determining using said relationship in determining said destination address; and said relationship relating said destination address to said known data type without relating said destination address to said source address.

12. A system for communicating data of a known data type from a source process to a destination process, the system comprising:

a source receiver that receives said data in a source format from said source process;

a source translator that converts said data from said source format to a standard format;

an addressing mechanism that determines a destination address that is associated with said destination process based upon at least one of said known data type and a source address that is associated with said source process;

a source transmitter that transmits said data in said standard format with said destination address;

a destination receiver that receives said data transmitted in said standard format at said destination address;

a destination translator that converts said data in said standard format to a destination format;

a destination transmitter that transmits said data in said destination format to said destination process;

an acknowledgment generator that generates an acknowledgment of receipt of said data when said data transmitted by said destination transmitter is received at said destination process; and a notifier that notifies a user of an error upon an occurrence of at least one of a specified number of other transmission attempts and an absence of said acknowledgment of receipt within a given time period.

13. The system of claim 12, wherein each of said source format, said standard format, and said destination format are different.

14. The system of claim 12, wherein:
said source format and said destination format are identical; and
said source format and said destination format are different from said standard format.

15. The system of claim 12, further comprising a system manager that, prior to said data in said source format being received by said source receiver, defines at least one of said known data type, said source address, said standard format, said destination format, and a relationship between said destination address and said at least one of said known data type and said source address.

16. The system of claim 15, wherein said system manager accepts user input that defines said known data type of said data.

17. The system of claim 15, wherein said system manager accepts user input that defines said source address of said source process.

18. The system of claim 15, wherein said system manager accepts user input that defines said source format of said data.

19. The system of claim 15, wherein said system manager accepts user input that defines said standard format of said data.

20. The system of claim 15, wherein said system manager accepts user input that defines said destination format of said data.

21. The system of claim 15, wherein said system manager accepts user input that defines said relationship between said destination address and said at least one of said known data type and said source address.

22. The system of claim 15, wherein:
said addressing mechanism uses said relationship in determining said destination address; and
said relationship relates said destination address to both said known data type and said source address.

23. The system of claim 15, wherein:
said addressing mechanism uses said relationship in determining said destination address; and
said relationship relates said destination address to said source address without relating said destination address to said known data type.

24. The system of claim 15, wherein:
said addressing mechanism uses said relationship in determining said destination address; and
said relationship relates said destination address to said known data type without relating said destination address to said source address.

25. The system of claim 12, wherein said destination translator comprises a selecting mechanism that selects said destination format from a plurality of available destination formats based upon said known data type of said data.

26. The system of claim 12, wherein said destination translator comprises a selecting mechanism that selects said destination format from a plurality of available destination formats based upon said destination address transmitted with said data in said standard format.

27. A method of communicating data of a known data type from a source process to a destination process, the method comprising:
receiving said data in a source format from said source process;
converting said data from said source format to a standard format;
determining a destination address that is associated with said destination process based upon at least one of said known data type and a source address that is associated with said source process;
transmitting said data in said standard format with said destination address;
receiving said data transmitted in said standard format at said destination address;
converting said data in said standard format to a destination format;
transmitting said data in said destination format to said destination process; and
prior to said receiving of said data in said source format, defining at least one of said known data type, said source address, said source format, said standard format, said destination format, and a relationship between said destination address and said at least one of said known data type and said source address,
wherein said determining uses said relationship in determining said destination address, and said relationship relates said destination address to both said known data type and said source address.

28. The method of claim 27, further comprising:
when said data transmitted in said destination format is received at said destination process, generating an acknowledgment of receipt of said data; and
notifying a user of an error upon an occurrence of at least one of a specified number of other transmission attempts and an absence of said acknowledgment of receipt within a given time period.

29. The method of claim 27, wherein each of said source format, said standard format, and said destination format are different.

30. The method of claim 27, wherein:
said source format and said destination format are identical; and
said source format and said destination format are different from said standard format.

31. The method of claim 27, wherein said defining comprises accepting user input that defines said known data type of said data.

32. The method of claim 27, wherein said defining comprises accepting user input that defines said source address of said source process.

33. The method of claim 27, wherein said defining comprises accepting user input that defines said source format of said data.

34. The method of claim 27, wherein said defining comprises accepting user input that defines said standard format of said data.

35. The method of claim 27, wherein said defining comprises accepting user input that defines said destination format of said data.

36. The method of claim 27, wherein said converting of said data from said standard format to said destination format comprises selecting said destination format from a plurality of available destination formats based upon said known data type of said data.

37. The method of claim 27, wherein said converting of said data from said standard format to said destination format comprises selecting said destination format from a plurality of available destination formats based upon said destination address transmitted with said data in said standard format.

38. A method of communicating data of a known data type from a source process to a destination process, the method comprising:

receiving said data in a source format from said source process;

converting said data from said source format to a standard format;

determining a destination address that is associated with said destination process based upon at least one of said known data type and a source address that is associated with said source process;

transmitting said data in said standard format with said destination address;

receiving said data transmitted in said standard format at said destination address;

converting said data in said standard format to a destination format;

transmitting said data in said destination format to said destination process; and prior to said receiving of said data in said source format, defining at least one of said known data type, said source address, said source format, said standard format, said destination format, and a relationship between said destination address and said at least one of said known data type and said source address, wherein said determining uses said relationship in determining said destination address, and said relationship relates said destination address to said source address without relating said destination address to said known data type.

39. The method of claim 38, further comprising:

when said data transmitted in said destination format is received at said destination process, generating an acknowledgment of receipt of said data; and notifying a user of an error upon an occurrence of at least one of a specified number of other transmission attempts and an absence of said acknowledgment of receipt within a given time period.

40. The method of claim 38, wherein each of said source format, said standard format, and said destination format are different.

41. The method of claim 38, wherein:

said source format and said destination format are identical; and said source format and said destination format are different from said standard format.

42. The method of claim 38, wherein said defining comprises accepting user input that defines said known data type of said data.

43. The method of claim 38, wherein said defining comprises accepting user input that defines said source address of said source process.

44. The method of claim 38, wherein said defining comprises accepting user input that defines said source format of said data.

45. The method of claim 38, wherein said defining comprises accepting user input that defines said standard format of said data.

46. The method of claim 38, wherein said defining comprises accepting user input that defines said destination format of said data.

47. The method of claim 38, wherein said converting of said data from said standard format to said destination format comprises selecting said destination format from a plurality of available destination formats based upon said known data type of said data.

48. The method of claim 38, wherein said converting of said data from said standard format to said destination format comprises selecting said destination format from a plurality of available destination formats based upon said destination address transmitted with said data in said standard format.

49. A method of communicating data of a known data type from a source process to a destination process, the method comprising:

receiving said data in a source format from said source process;

converting said data from said source format to a standard format;

determining a destination address that is associated with said destination process based upon at least one of said known data type and a source address that is associated with said source process;

transmitting said data in said standard format with said destination address;

receiving said data transmitted in said standard format at said destination address;

converting said data in said standard format to a destination format;

transmitting said data in said destination format to said destination process; and prior to said receiving of said data in said source format, defining at least one of said known data type, said source address, said source format, said standard format, said destination format, and a relationship between said destination address and said at least one of said known data type and said source address, wherein said determining uses said relationship in determining said destination address, and said relationship relates said destination address to said known data type without relating said destination address to said source address.

50. The method of claim 49, further comprising:

when said data transmitted in said destination format is received at said destination process, generating an acknowledgment of receipt of said data; and notifying a user of an error upon an occurrence of at least one of a specified number of other transmission attempts and an absence of said acknowledgment of receipt within a given time period.

51. The method of claim 49, wherein each of said source format, said standard format, and said destination format are different.

52. The method of claim 49, wherein:
said source format and said destination format are identical; and
said source format and said destination format are different from said standard format.

53. The method of claim 49, wherein said defining comprises accepting user input that defines said known data type of said data.

54. The method of claim 49, wherein said defining comprises accepting user input that defines said source address of said source process.

55. The method of claim 49, wherein said defining comprises accepting user input that defines said source format of said data.

56. The method of claim 49, wherein said defining comprises accepting user input that defines said standard format of said data.

57. The method of claim 49, wherein said defining comprises accepting user input that defines said destination format of said data.

58. The method of claim 49, wherein said converting of said data from said standard format to said destination format comprises selecting said destination format from a plurality of available destination formats based upon said known data type of said data.

59. The method of claim 49, wherein said converting of said data from said standard format to said destination format comprises selecting said destination format from a plurality of available destination formats based upon said destination address transmitted with said data in said standard format.

60. A system for communicating data of a known data type from a source process to a destination process, the system comprising:
a source receiver that receives said data in a source format from said source process;
a source translator that converts said data from said source format to a standard format;
an addressing mechanism that determines a destination address that is associated with said destination process based upon at least one of said known data type and a source address that is associated with said source process;
a source transmitter that transmits said data in said standard format with said destination address;
a destination receiver that receives said data transmitted in said standard format at said destination address;
a destination translator that converts said data in said standard format to a destination format;
a destination transmitter that transmits said data in said destination format to said destination process; and
a system manager that, prior to said data in said source format being received by said source receiver, defines at least one of said known data type, said source address, said standard format, said destination format, and a relationship between said destination address and said at least one of said known data type and said source address.

61. The system of claim 60, further comprising:
an acknowledgment generator that generates an acknowledgment of receipt of said data when said data transmitted by said destination transmitter is received at said destination process; and
a notifier that notifies a user of an error upon an occurrence of at least one of a specified number of other transmission attempts and an absence of said acknowledgment of receipt within a given time period.

62. The system of claim 60, wherein each of said source format, said standard format, and said destination format are different.

63. The system of claim 60, wherein:
said source format and said destination format are identical; and
said source format and said destination format are different from said standard format.

64. The system of claim 60, wherein said system manager accepts user input that defines said known data type of said data.

65. The system of claim 60, wherein said system manager accepts user input that defines said source address of said source process.

66. The system of claim 60, wherein said system manager accepts user input that defines said source format of said data.

67. The system of claim 60, wherein said system manager accepts user input that defines said standard format of said data.

68. The system of claim 60, wherein said system manager accepts user input that defines said destination format of said data.

69. The system of claim 60, wherein said system manager accepts user input that defines said relationship between said destination address and said at least one of said known data type and said source address.

70. The system of claim 60, wherein:
said addressing mechanism uses said relationship in determining said destination address; and
said relationship relates said destination address to both said known data type and said source address.

71. The system of claim 60, wherein:
said addressing mechanism uses said relationship in determining said destination address; and
said relationship relates said destination address to said source address without relating said destination address to said known data type.

72. The system of claim 60, wherein:
said addressing mechanism uses said relationship in determining said destination address; and
said relationship relates said destination address to said known data type without relating said destination address to said source address.

73. The system of claim 60, wherein said destination translator comprises a selecting mechanism that selects said destination format from a plurality of available destination formats based upon said known data type of said data.

74. The system of claim 60, wherein said destination translator comprises a selecting mechanism that selects said destination format from a plurality of available destination formats based upon said destination address transmitted with said data in said standard format.

75. A method of communicating data from a source process to a destination process, the method comprising:
receiving the data in a source format from the source process;
converting the data from the source format to a standard format;
transmitting the data in the standard format to a destination address that is associated with the destination process;
receiving the data transmitted in the standard format at the destination address;

converting said data from the standard format to a destination format;

transmitting the data in the destination format to the destination process;

generating an acknowledgment of receipt of the data when the data is received at the destination process;

notifying a user of an error upon an occurrence of at least one of a specified number of other transmission attempts and an absence of the acknowledgment of receipt within a given time period;

identifying the data type of the transmitted data after receiving the data in the source format from the source process; and determining the destination address based upon the identified data type of the transmitted data, wherein the communicated data is of a known data type.

76. A method of communicating data from a source process to a destination process, the method comprising:

receiving the data in a source format from the source process;

converting the data from the source format to a standard format;

transmitting the data in the standard format to a destination address that is associated with the destination process;

receiving the data transmitted in the standard format at the destination address;

converting said data from the standard format to a destination format;

transmitting the data in the destination format to the destination process;

generating an acknowledgment of receipt of the data when the data is received at the destination process;

notifying a user of an error upon an occurrence of at least one of a specified number of other transmission attempts and an absence of the acknowledgment of receipt within a given time period;

identifying the data type of the transmitted data after receiving the data in the source format from the source process; and determining the destination address based upon the identified data type of the transmitted data and a source address associated with the source process, wherein the communicated data is of a known data type.

77. A method of communicating data of a known data type from a source process to a destination process, the method comprising:

accepting user input that defines a relationship between a destination address that is associated with the destination process and at least one of the known data type and a source address that is associated with the source process;

receiving the data in a source format from the source process;

converting the data from the source format to a standard format;

determining the destination address based upon the defined relationship after receiving the data in the source format from the source process;

transmitting the data in the standard format to the destination address;

receiving the data transmitted in the standard format at the destination address;

converting the data in the standard format to a destination format; and transmitting the data in the destination format to the destination process.

78. The method of claim 77 further comprising:

defining the known data type, the source address, the source format, the standard format, and the destination format, prior to receiving the data in the source format.

79. The method of claim 78, wherein the step of defining comprises accepting user input that defines the known data type, the source address, the source format, the standard format, and the destination format.

80. The method of claim 77, wherein the step of converting the data from the standard format to the destination format comprises selecting the destination format from a plurality of available destination formats based solely upon the known data type.

81. The method of claim 77, wherein:

the data is transmitted in the standard format with the destination address; and the step of converting the data from the standard format to the destination format includes selecting the destination format from a plurality of available destination formats based upon the destination address transmitted with the data in the standard format.

* * * * *